(12) United States Patent
Toye

(10) Patent No.: US 6,823,565 B2
(45) Date of Patent: Nov. 30, 2004

(54) SHEET FASTENING AND ANCHORING COMPONENT AND SYSTEM

(75) Inventor: Jonathan Dallas Toye, Auckland (NZ)

(73) Assignee: Extenday IP Limited, Auckland (NZ)

( * ) Notice: Subject to any disclaimer, the term of this patent is extended or adjusted under 35 U.S.C. 154(b) by 0 days.

(21) Appl. No.: 10/245,042

(22) Filed: Sep. 16, 2002

(65) Prior Publication Data

US 2003/0101546 A1 Jun. 5, 2003

Related U.S. Application Data

(63) Continuation-in-part of application No. 10/018,010, filed as application No. PCT/NZ00/00062 on Apr. 26, 2000, now abandoned.

(51) Int. Cl.[7] .............................................. F16B 45/00
(52) U.S. Cl. ................................... 24/265 H; 24/300
(58) Field of Search ......................... 24/380, 369, 370, 24/716, 72.5, 710.9, 711.2, 711.5, 300, 265 H, 359, 360, 698.3; 160/409; 16/87.3; 248/218.3

(56) References Cited

U.S. PATENT DOCUMENTS

| | | | |
|---|---|---|---|
| 316,261 A | 4/1885 | Hart, Jr. ........................ 24/186 |
| 378,597 A | 2/1888 | Kramer et al. ................. 24/711 |
| 524,834 A | * 8/1894 | Mayent ........................ 24/300 |
| 544,971 A | 8/1895 | Donnelly ....................... 24/359 |
| 568,221 A | 9/1896 | Walton ......................... 24/359 |
| 621,190 A | 3/1899 | Weiss et al. ................... 24/359 |
| 823,317 A | 6/1906 | Best ............................ 24/710.9 |
| 1,037,334 A | 9/1912 | Schneider ..................... 24/359 |
| 1,737,300 A | * 11/1929 | Dayton ......................... 24/300 |
| 2,328,474 A | * 8/1943 | Lewis .......................... 24/300 |
| 2,459,735 A | 1/1949 | McKinnon ...................... 29/7 |
| 2,680,891 A | * 6/1954 | Detzke ........................ 24/710.3 |
| 2,820,269 A | * 1/1958 | Wolff .............................. 24/9 |
| 2,900,692 A | * 8/1959 | Lincoln ....................... 24/710.9 |
| 3,970,227 A | 7/1976 | Hardy |
| 4,236,688 A | * 12/1980 | Wilk ............................. 248/71 |
| 4,717,157 A | 1/1988 | Smith |
| 4,979,714 A | 12/1990 | Russell et al. |
| 5,056,247 A | 10/1991 | Loomie |
| 5,067,205 A | 11/1991 | Chen et al. |
| 5,406,680 A | 4/1995 | Silverberg |
| 5,465,596 A | 11/1995 | Park |
| 5,546,639 A | 8/1996 | Lacore et al. |
| 5,638,584 A | 6/1997 | De Anfrasio |
| 5,729,870 A | 3/1998 | Sharp |
| 6,014,794 A | 1/2000 | Mc Coy |
| 6,081,975 A | 7/2000 | Norrby ......................... 24/369 |
| 6,122,806 A | 9/2000 | Umezawa et al. |

FOREIGN PATENT DOCUMENTS

| | | |
|---|---|---|
| FR | 2352204 | 12/1977 |
| FR | 2404759 | 4/1979 |
| WO | WO 98/41769 | 9/1998 |
| WO | WO 98/41770 | 9/1998 |

* cited by examiner

Primary Examiner—Robert J. Sandy
(74) Attorney, Agent, or Firm—Hovey Williams LLP

(57) ABSTRACT

The invention provides a fastening component for use in anchoring agricultural sheet, textile or film to a support, and a system and method of anchoring agricultural sheeting, textile or film. The fastening component including one or more prongs arranged to engage the sheeting, textile or film to connect the component to the sheeting, textile or film, and attachment means enabling a length of resiliently extensible and/or inextensible material to be attached to the component and to the support. The fastening component may be used in combination with a length of resiliently extensible material and/or inextensible material, arranged to be releasably fastened at the other end to the support. The fastening component may include two arms, each including one or more prongs, the arms being joined at an attachment eye having an entry such that the arms move away from one another when a hook or loop on one end of a length of resiliently extensible and/or inextensible material is manually pulled through the entry and into the eye to connect the hook or loop to the fastening component.

35 Claims, 7 Drawing Sheets

SHEET FASTENING AND ANCHORING COMPONENT AND SYSTEM

RELATED APPLICATION

This is a continuation-in-part of application Ser. No. 10/018,010 filed Oct. 23, 2001, now abandoned, incorporated by reference herein, which is a 35 U.S.C. Section 371 National Phase of International Application PCT/NZ00/00062 filed Apr. 26, 2000 and published in English, claiming priority from New Zealand Application No. 335406 filed Apr. 23, 1999; applicant further claims priority under 35 U.S.C. Section 119 of New Zealand Provisional Patent Application No. 514,194 filed 14 Sep. 2001 and New Zealand Application No. 335406 filed Apr. 23, 1999.

FIELD OF INVENTION

The invention relates to a fastening component and a fastening system, particularly but not solely designed for use in anchoring agricultural sheeting, textile or film to a support, and a method of anchoring agricultural sheeting, textile or film to a support.

BACKGROUND TO INVENTION

It is known in the art to use a ground cover material in association with agricultural crops. Traditionally, these materials have been attached or fastened to the ground by placement of weights on top of the material, such as soil along the edge of the material, soil in discrete piles, stones or rocks, lengths of wood or timber, bags filled with sand or soil and/or plastic containers filled with water. Other forms of fasteners penetrate the material and extend into the soil below, such as U-shaped wire staples, plastic pins and wire nails or pins.

Weights placed on top of the cover have the disadvantage that they are cumbersome and/or time consuming to apply. The weights are traditionally bulky objects extending above the cover and so restrict traffic over the cover. Where the cover is designed to reflect light, placement of opaque weights on the cover may reduce the effectiveness of the material.

Where a staple, pin or nail is used, there is a potential that the material will be damaged or weakened. When traffic, such as tractors, move over the material, the load of the traffic is borne around the fastener and the area where the fastener penetrates the cover can rip or tear, such that the fastener no longer holds the cover. If the cover around the fastener does not rip, then the force of the traffic is borne by the fastener fully, so that it can be directly or progressively dislodged from the soil and therefore no longer acts as an effective fastener.

The same difficulties may be experienced where the material is used in areas of high wind. The force of the wind tends to lift the cover from the ground surface. Where weights are placed on top of the cover, the force of the wind can lift the cover out from under the weights. Alternatively, where a fastener that penetrates the material is used, the cover can rip or tear where the fastener penetrates the material and the fastener may be also directly or progressively dislodged from the soil.

SUMMARY OF INVENTION

In broad terms the invention comprises a fastening component for use in anchoring agricultural sheeting, textile or film to a support including one or more prongs arranged to engage the sheeting, textile or film to connect the component to the sheeting, textile or film and attachment means enabling a length of resiliently extensible and/or inextensible material to be attached to the component to fix the component to the support.

In another form the invention comprises the above fastening component in combination with a length of resiliently extensible material and/or inextensible material, arranged to be releasably fastened at one end to the attachment means and releasably fastened at the other end to the support.

In broad terms in another form, the invention comprises a method of anchoring agricultural sheeting, textile or film to a support including the steps of connecting the above fastening component to the sheeting, textile or film by piercing the prong(s) of the component through the sheeting, textile or film, and connecting a length of resiliently extensible and/or inextensible material between the fastening component and the support.

In another form, in broad terms, the invention comprises a method of anchoring agricultural sheeting, textile or film to a support including the steps of connecting the above fastening component to the sheeting, textile or film by engaging the prong(s) of the component in one or more apertures in or associated with the sheeting, textile or film, and connecting a length of resiliently extensible and/or inextensible material between the fastening component and the support.

In yet another form in broad terms the invention comprises agricultural sheeting, textile or film anchored to a support or supports by the above method.

In another form broad terms in one aspect the invention comprises a fastening system for anchoring agricultural sheeting to a support, including:

a fastening claw including one or more prongs adapted to pierce the sheeting, textile or film to connect the fastening claw to the sheeting, textile or film, and an attachment eye at an opposite end of the fastening claw, and a clip formed by a single length of material including two end portions which overlap so that the clip is a closed loop and which end portions are resiliently biased towards each other, the terminal and of at least one end portion extending away from the other end portion to form an entry aperture which enables the attachment eye of the fastening claw or a length of resiliently extensible and/or inextensible material connectable to the fastening claw to be pulled through the entry aperture to connect to or disconnect from the clip, or which enables the clip to itself be connected to or disconnected from another link.

Preferably the clip is formed from a length of stiff metal wire. Preferably the fastening claw is also formed from a single length of stiff metal wire, each end of which forms a prong of the fastening claw. Preferably said length of wire forming the fastening claw is bent intermediate of its length to form two arms each of which extends to form one side of an attachment eye and then one of the prongs and to form an entry to the attachment eye defined between two intermediate portions of the two arms.

Preferably the terminal end of the clip extends into the area bound by a circumference of the closed loop of the clip. Preferably the terminal end also extends away from a plane of the clip.

In another form in broad terms the invention comprises a method of anchoring agricultural sheeting to a support including the steps of, in any order, connecting a length of resiliently extensible material to each of the fastening claw and the clip of the fastening system, attaching the fastening claw to the sheeting by piercing the prong(s) of the fastening claw through the sheeting, attaching the clip to a fixed support, and stretching the length of material to anchor the sheeting under tension.

BRIEF DESCRIPTION OF THE DRAWINGS

Preferred forms of the fastening component and method will now be described by way of example and without intending to be limiting, with reference to the accompanying drawings in which.

DETAILED DESCRIPTION OF PREFERRED FORMS

Figure 1:
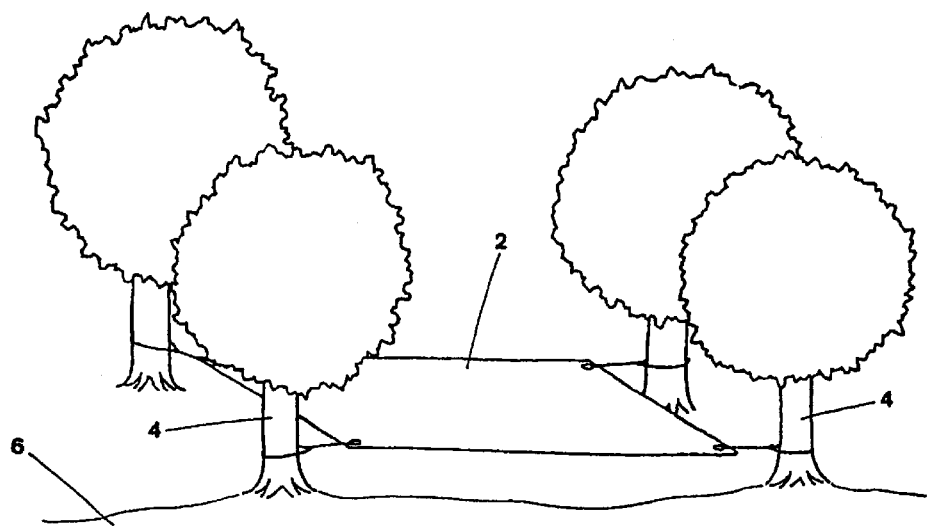
FIG. 1 shows the invention in use.

FIG. 1 illustrates one preferred use of the invention. Agricultural sheeting, textile or film 2 is shown anchored underneath agricultural crops 4. The preferred agricultural sheeting, textile or film is formed of a suitable non-woven, woven or knitted textile or film or sheeting material, particularly suitable for ground cover, and may have reflective properties. It will be appreciated that the sheeting, textile or film could be anchored along a crop row and the fasteners could be positioned around the base of each trunk or vine as a support.

The fastening component, with a length of resiliently extensible and/or inextensible material, that is fastened to the sheeting, textile or film, could be attached to the support or supports, for example between 10 mm and 500 mm and preferably between 100 mm and 200 mm, above the ground surface. Alternatively the fastening component, with a length of resiliently extensible and/or inextensible material, that is fastened to the sheeting, textile or film, could be attached to the support or supports at the ground surface or could be suspended above the crops if the sheeting, textile or film needs to above the crop to impart its benefits such as to provide shade, light transmission properties, wind cover or protection from pests.

The preferred form fastening component of the invention is arranged to anchor the agricultural sheeting, textile or film 2 to a suitable support. The support could comprise a branch or trunk of a tree 4 or vine crop. Alternatively, the support could comprise a suitable stake, peg, post or pole or a wire tensioned along a crop row.

Figure 2:
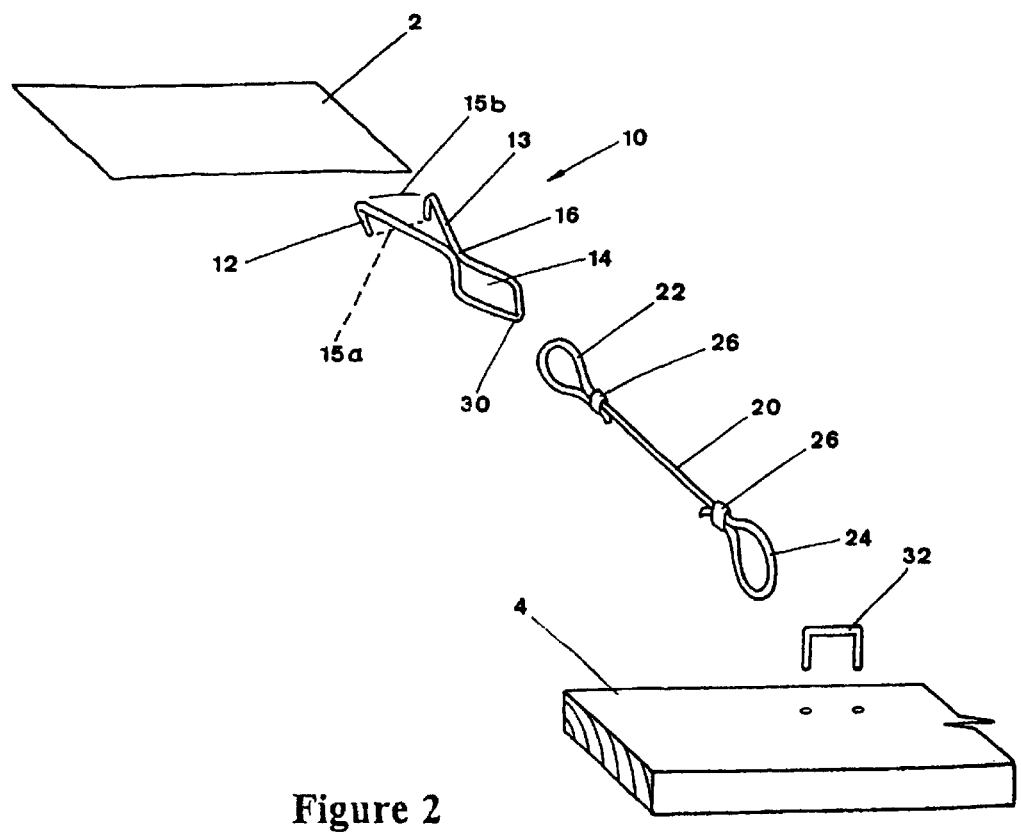
FIG. 2 shows a preferred form fastening component and preferred form attachment cord.

A preferred form fastening component 10 is shown in FIG. 2. The fastening component 10 includes two prongs 12 and 13, which are arranged to pierce the sheeting, textile or film 2. Where the material 2 is formed from a suitable non-woven, woven or knitted textile material, the prongs 12 and 13 can be simply forced through the material. Where the material is formed from a weaker material like a film, it is envisaged that the material could be provided with a length of reinforced material around the perimeter through which the prongs are forced. Alternatively, the sheeting, textile or film material 2 could be provided with reinforced apertures, eyelets, domes or similar through which prongs 12 and 13 may be engaged, as will be described below.

One preferred form fastening component 10 is formed from a length of wire and the ends of the wire are shaped to form prongs 12 and 13. Where the fastening component is formed from a length of wire, it will be appreciated that successive lengths of wire could be cut at an angle to provide the prongs with sharp points to assist in piercing the sheeting, textile or film 2.

As shown in FIG. 2, the length of wire is preferably bent intermediate of its length to form two arms, each arm terminating in one of prongs 12 and 13. As shown in FIG. 2 each of the arms is preferably bent back on itself at greater than a right angle to form the prongs, thereby reducing accidental disengagement of the prongs from the textile 2. The wire is preferably bent so that each arm is of substantially equal length. The shape of the arms and prongs are designed to anchor the agricultural sheeting, textile or film securely and yet be fastened to and unfastened from the sheeting, textile or film easily.

The distance between the prong tips as indicated at 15A is preferably less than the distance between each arm/prong junction as indicated at 15B. This arrangement has the effect of tensioning the prongs together with the sheeting, textile or film when the prongs are inserted into the material thereby further reducing the opportunity for accidental disengagement.

Alternatively, the distance between the prong tips as indicated at 15A could be equal to or greater than the distance between each arm/prong junction as indicated at 15B. Where the distance is greater, it has the effect of tensioning the prongs together with the sheeting, textile or film when the prongs are inserted into the material as for 15A.

The fastening component 10 is also provided with attachment means enabling a length of material to be attached to the component 10 to fix the component to a support. One form of attachment means is shown as an eye 14. Each of the arms of the fastening component is preferably cranked away from the other and then towards the other arm part way along the length of each arm as shown to form the attachment eye 14.

A preferred form extensible or inextensible material 20 is arranged to be releasably fastened at one end to the eye 14 of the fastening component 10 and releasably fastened at the other end to support 4. The preferred form material 20 comprises a length of resiliently extensible material in the shape of a cord formed of rubber or a synthetic elastic material. The preferred cord is provided with loops 22 and 24 at each end of the cord. Loops are preferably formed by doubling a length of cord 20 back on itself to form a loop and securing the loop with a suitable length of wire or plastic 26.

The arms of the fastening component 10 are preferably tensioned towards each other to close the eye 14. Loop 22 of cord 20 in use is passed over one of prongs 12 or 13 and pulled between the arms through point 16 and into the eye 14. As the arms are tensioned toward each other at point 16, the loop 22 is retained within eye 14.

The preferred eye 14 is substantially quadrilateral in shape so that loop 22 is retained in the eye 14 at point 30, thereby reducing lateral movement of the loop 22 with respect to the fastening component 10.

As shown in FIG. 2, loop 24 could be secured to support 4 with a staple 32 or other suitable fastener for example a nail or spike or by a length of twine tried around the support.

Figure 3A:
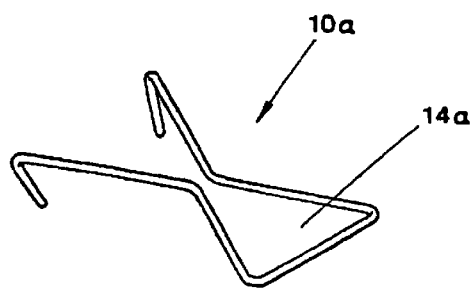
FIGS. 3A to 3E show preferred form fastening components.

FIGS. 3A, 3B, 3C, 3D and 3E illustrate further preferred forms of fastening component. As shown in FIG. 3A, the attachment means 14A could be substantially triangular in shape and the arms of the fastening component 10A could be spaced apart so as not to close the attachment means 14A.

Figure 3B:
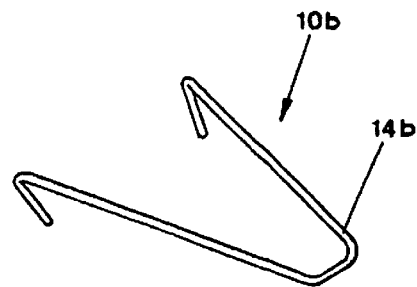

As shown in FIG. 3B, the fastening component 10B could be formed from two arms which are not cranked away from each other and towards each other along the length of each arm. The attachment means 14B is simply formed as a straight section between each of the arms.

Figure 3C:
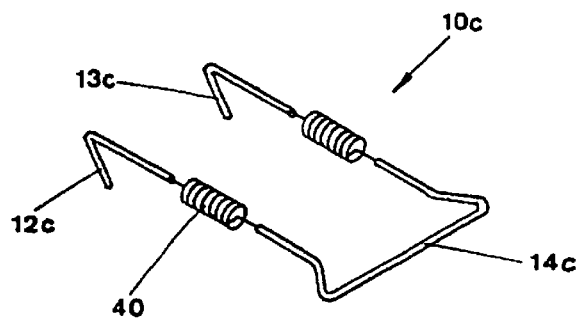

FIG. 3C illustrates a further preferred form fastening component 10C in which springs 40 or other resiliently extensible material are positioned between the prongs 12C and 13C and the attachment means 14C.

Figure 3D:
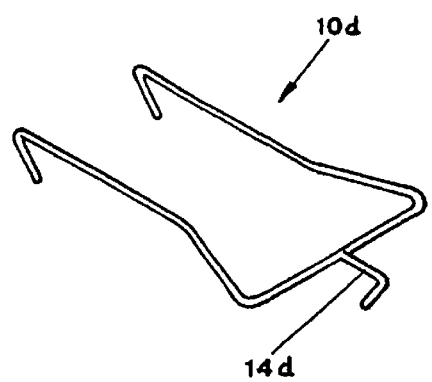

As shown in FIG. 3D, the attachment means could comprise a hook 14D or loop to which the cord is attached.

Figure 3E:
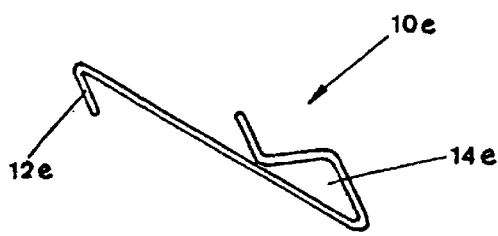

FIG. 3E shows another preferred form fastening component 10E which includes a single prong 12A. The prong is preferably formed by bending the arm back on itself at greater than a right angle. The fastening component 10E is also provided with attachment means such as an attachment eye 14E enabling a length of material to be attached to the component. As shown, the attachment eye 14E could be formed by doubling a length of the wire back on itself to form a loop, with the end of the wire tensioned towards the wire at a point intermediate the length of the wire. The cord or similar is able to be pulled down the shaft of the fastening component 10E into the attachment eye 14E. The tension between the shaft and the loop restricts the cord from leaving the eye.

The attachment eye 14E could be substantially triangular in shape as shown in FIG. 3E. It will be appreciated that the shape of the eye could be varied, for example to a circular or ellipsoid shape.

It will be appreciated that the fastening component could be formed from a single length of inextensible wire or could alternatively be formed from a combination of extensible and inextensible wire materials. The fastening component could also be formed entirely or at least partly of plastic and/or plastic strengthening materials. The plastic or similar synthetic type materials could be formed partly or completely from extensible or inextensible materials or a combination of the above materials.

Figure 4A:
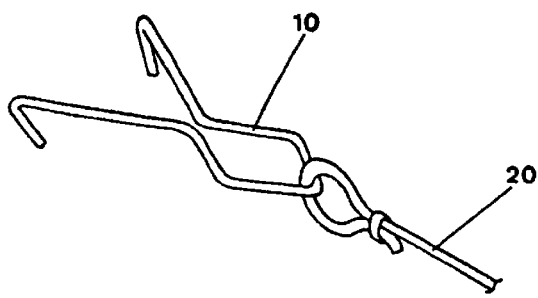
FIGS. 4A to 4D show preferred form attachment cords and methods.
Figure 4B:
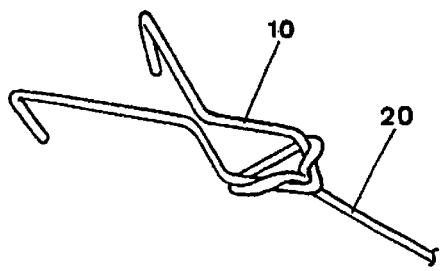

FIGS. 4A to 4D illustrate preferred forms of cord and methods of attachment to the fastening component. It will be appreciated that cord 20 could be provided with a suitable loop, hook or clip at one or both ends. FIG. 4A illustrates the cord 20 of FIG. 2 fastened to the fastening component 10, having passed the loop 20 between the arms of the fastening component. As shown in FIG. 4B, the cord 20 could alternatively be threaded through the eye of the fastening component 10 and then pulled tight as shown.

Figure 4C:
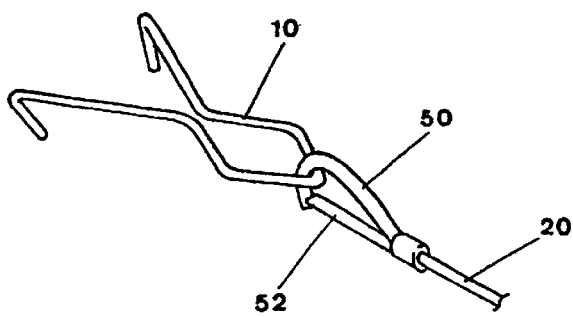

Referring to FIG. 4C, the cord 20 could alternatively terminate in a hook 50 formed from a suitable plastics material. As shown in FIG. 4C, the hook 50 could be formed as a clip having a suitable closure or retainer 52.

Figure 4D:
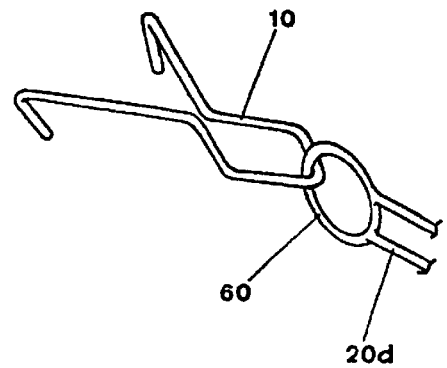

FIG. 4D illustrates a further preferred form cord 20D formed of rubber, terminating in a reinforced rubber ring 60, which is threaded onto the fastening component 10.

Figure 5A:
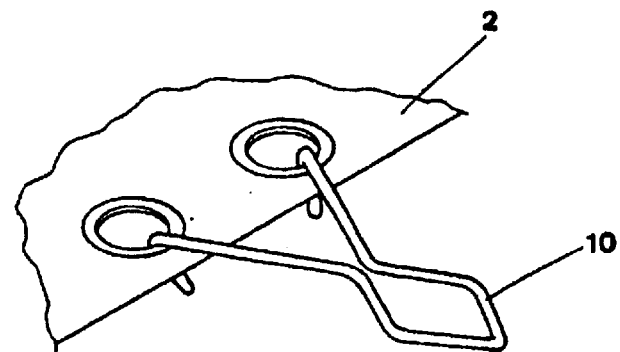
FIGS. 5A to 5C show preferred form apertures, eyelets and domes with apertures for the prong or prongs.
Figure 5B:
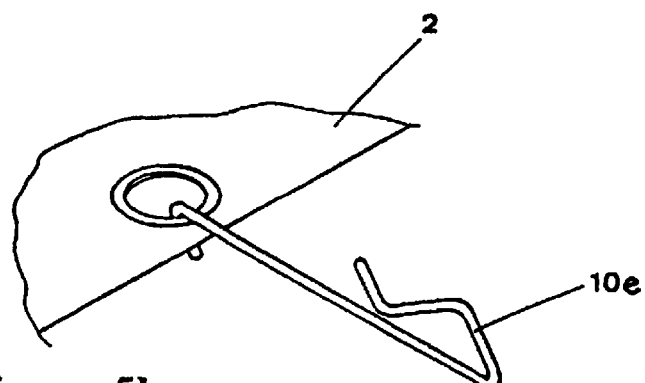
Figure 5C:
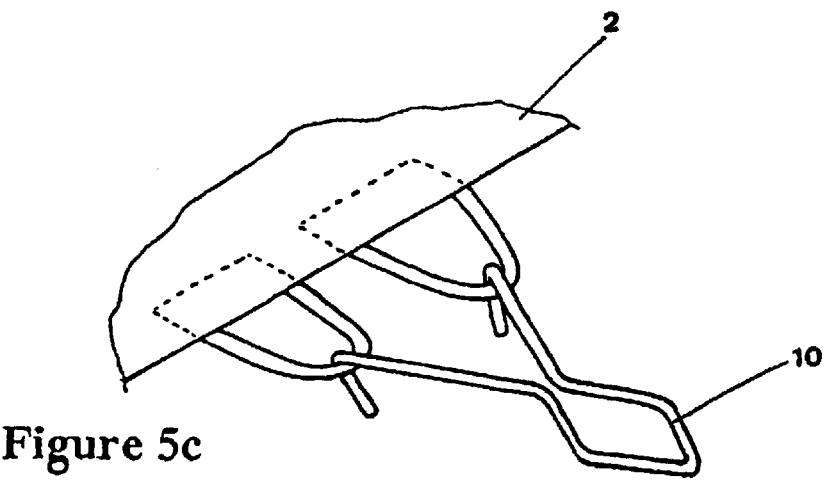

FIGS. 5A to 5C illustrate preferred forms of apertures, eyelets, domes or similar means to prevent or at least restrict the prong or prongs from ripping the agriculture sheeting, textile or film.

FIG. 5A shows eyelets formed in the sheeting, textile or film 2 and fastening component 10 of FIG. 2 located in the eyelets. The eyelet(s) could alternatively be formed as a reinforced section of material secured to the sheeting, textile or film which is pierced by the prongs of the component. FIG. 5C shows the component 10E of FIG. 3E piercing a dome or clip type fastener. FIG. 5C shows the prong of FIG. 3E fitting through a loop on the dome or clip type fastener. FIG. 5D is a dome or clip type fastener where the prongs are placed through a loop associated with but external to the sheeting, textile or film 2.

The cord could be formed entirely of an extensible or inextensible material, or could be formed of an extensible material along part of its length and an inextensible material along part of its length. For example, the extensible cord could be attached to a suitable inextensible plastic strapping or twine for part of its length. The plastic strapping and twine is generally less expensive than the extensible materials, therefore reducing production costs. The plastic strap or twine may also be arranged to have variable length to act as an adjustment system to vary the tension on the cord, depending on the requirements of the system.

In use, the cord 20 is secured to support 4, for example by driving a staple 32, spike or nail into the support 4. The other end of the cord is attached to the fastening component 10 and the cord 20 is stretched by pulling the fastening component 10 away from the support 4 and connecting the fastening component 10 to the sheeting, textile or film 2 while the cord 20 is stretched to place the sheeting, textile or film 2 under tension. Where it is desired to anchor a length of sheeting, textile or film, it is envisaged that the above step could be repeated to connect successive fastening components 10 and cords 20 along the textile or film 2 to anchor the textile or film 2 to one or more supports 4.

The preferred fastening component is arranged so that the component is easily and quickly engageable and disengageable with material 2, the cord 20 is easily and quickly engageable and disengageable with the component, and the cord is easily and quickly engageable and disengageable with support 4. When the material 2 is used as ground cover, this allows the material 2 to be removed from the component 10 and/or cord along one side of a row of crops or trees and folded back in the other row, then later unfolded and reattached, or unattached along both sides of the material 2 and removed from the field. Such easy and quick reattachment is desirable during installation of the material in the spring and removal of the material 2 in the autumn. Easy and quick reattachment is also desirable for time critical activities such as during spring frosts to fold back the material to allow ground heat being held by the material 2 to be more easily released to reduce frost damage and for crops with multiply harvest picks where it is desirable to have the material in place between picks and where it is desirable to fold back the material at each harvest pick.

Once the material 2 is fastened in accordance with the invention, for example, as ground cover, a tractor or similar traffic may be driven over the material 2. The pulling force of the wheels of the traffic pulls on the cover and this force is transferred to the cord, causing the cord to stretch. As the tractor or traffic moves down the row past the tensioned cord, the pulling force is removed and the cord returns to its resting position.

In areas of high wind, the force of the wind tends to lift the material 2 away from the ground. This lifting or pulling force is partly absorbed by the tensioned cord, which acts similarly to a shock absorber. The material 2 lifts on one side due to the wind, and under pressure from the wind and rubber cord or band, the other side of the material then lifts to release the pressure. The material 2 develops a pulsing or wave action along the surface in response to the wind. This pulsing force, which absorbs some of the wind's force, rather than being borne fully on the material and fasteners, gives a more effective and efficient fastening system. In addition, the pulsing or wave action acts as a force to clean soil, leaves or fruit from the surface of the material 2.

It will be appreciated that the material may be used as ground cover, but may also be used as greenhouse or other crop covers, shade cloth, windbreak, bird netting or other uses. The fastening component may be used to fasten this material regardless of the us which is made of the material.

Figure 6:
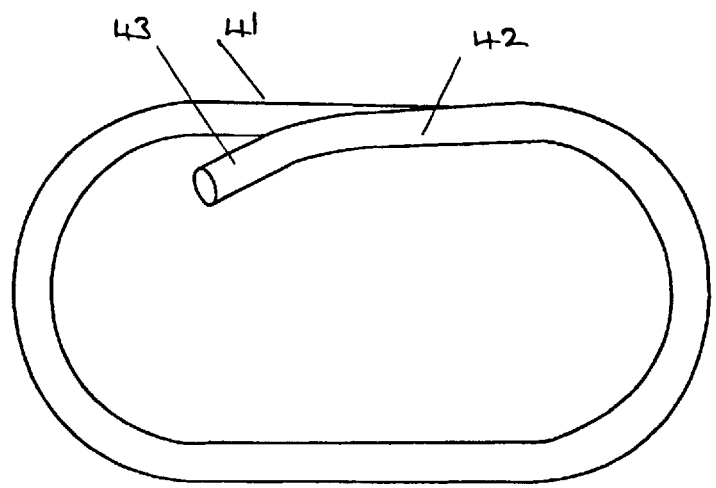
FIG. 6 shows a preferred form clip from one side.
Figure 7:
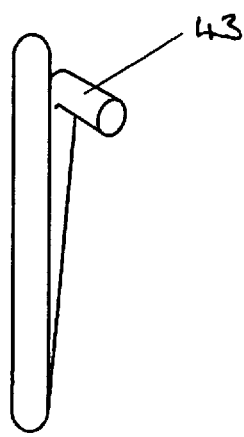
FIG. 7 shows a preferred form clip from one end.
Figure 8:
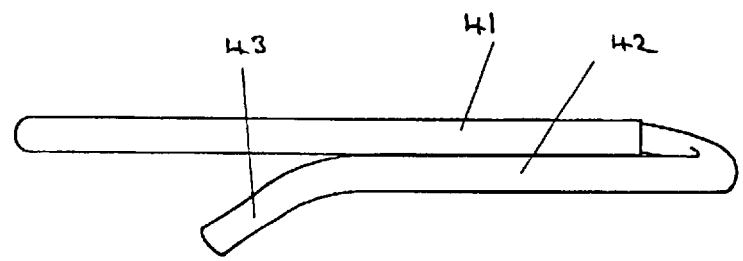
FIG. 8 shows a preferred form clip from above.

A preferred form clip which can be used with the fastening component is shown in FIGS. 6 to 8. It is formed from a length of stiff wire bent to form a closed loop and so that the two end portions 41 and 42 overlap as shown, and are resiliently biased towards each other. Alternatively the clip could be moulded or cast from a plastics material. The terminal end 43 of at least one of the two end portions 41 and 42 extends away from the other end portion to form an entry aperture into the clip. While the terminal end 43 could extend in the main plane of the clip ie the plane of the page in FIG. 6, and downwardly into the area bound by the circumference of closed loop of the clip, in a preferred form the terminal end extends away from the main plane of the clip, as best seen from FIG. 7. In alternative form again the terminal end may extend away from the main plane of the clip as in FIG. 3, but not into the area bound by the circumference of the closed loop of the clip, i.e. the terminal end 43 may extend parallel to the other end portion 41, or outwardly from the circumference of clip.

Figure 9:
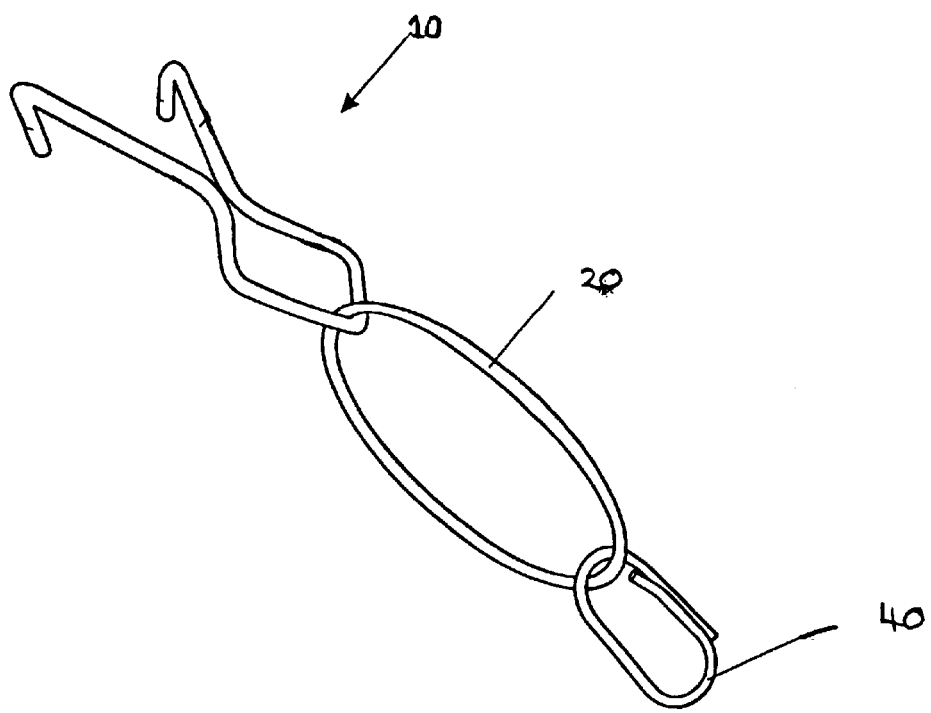
FIG. 9 shows a preferred form fastening claw and clip connected by a length of extensible and/or inextensible material.
Figure 10:
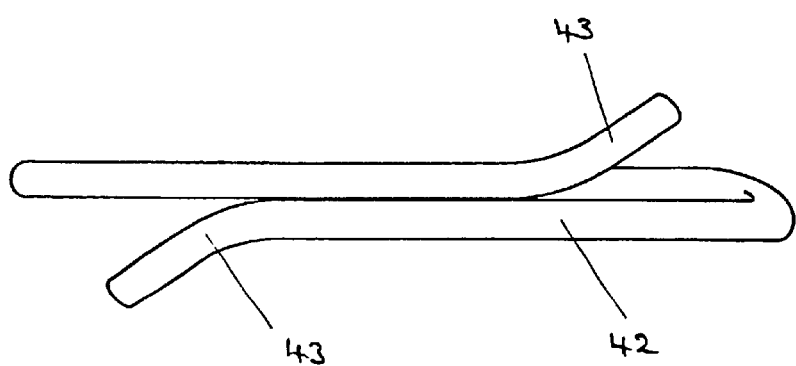
FIG. 10 shows another preferred form of clip, from above.

FIG. 10 is a view from above similar to FIG. 9 but of another preferred form clip, in which the terminal end of the other end portion 41 is similarly angled, to form an entry aperture on the opposite side of the clip also.

Figure 11:
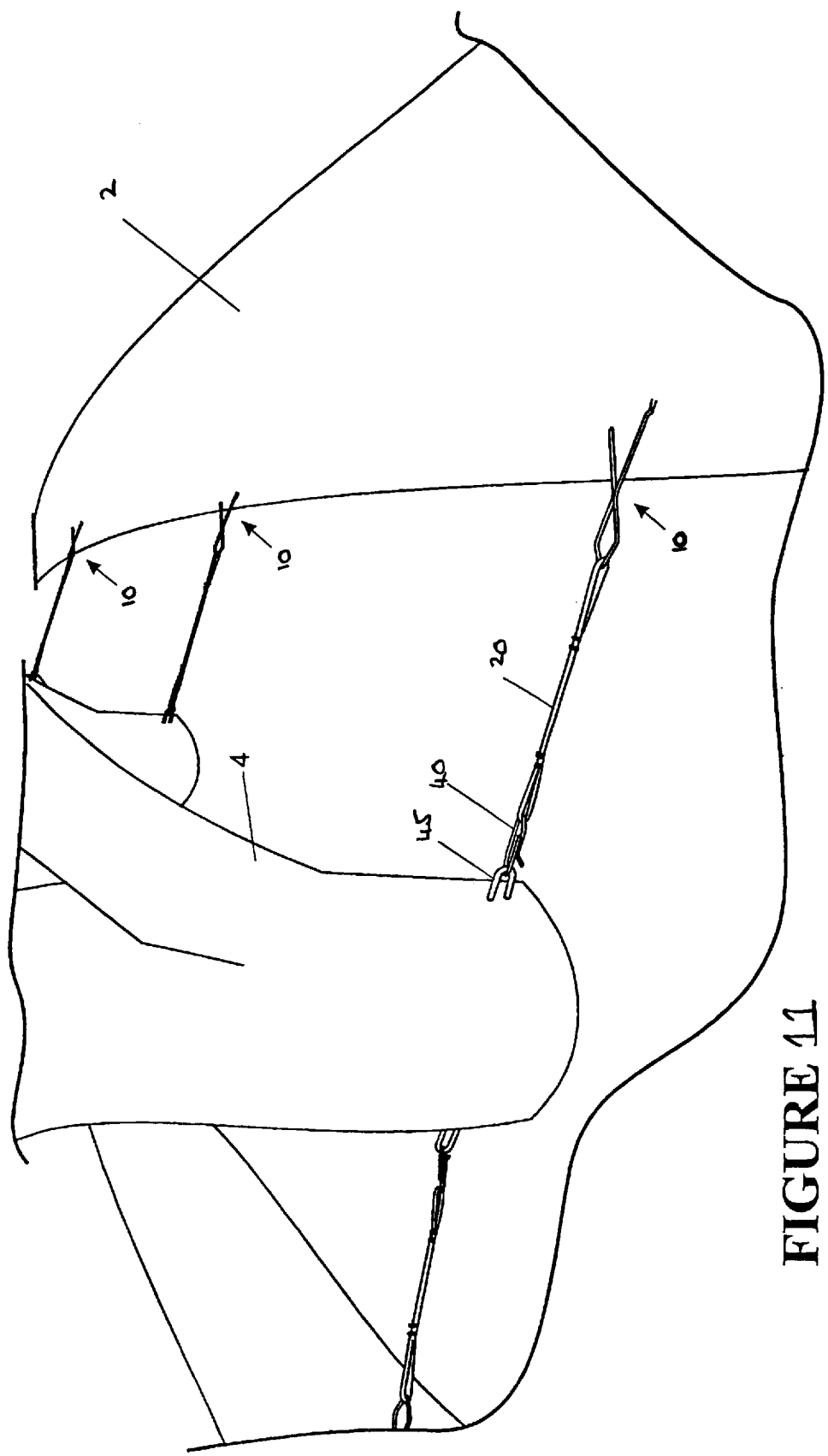
FIG. 11 shows the fastening system including the clip of FIGS. 6 to 9 in use.

The entry aperture formed by bent terminal end or ends 43 enable(s) cord 20 to be connected to the clip 40, or the clip 40 to also be connected to another link such as staple 45 in FIG. 11, by pulling the cord through the entry aperture defined by the terminal end 43 and between the overlapping end portions 41 and 42 and into the interior of the closed loop of the clip, or by engaging the clip on to the staple or similar which in the latter case can be done with one hand. Alternatively the clip may be attached to a piece of wire or twine around a tree, or to a wire running along a row of trees or to any other suitable means. The cord 20 may be disconnected from the clip or the clip disconnected from the staple 45 or other link, using the same entry aperture, or alternatively in a clip such as that shown in FIG. 6 by using the other entry aperture.

In an alternative form the clips may be the same or similar in shape as the preferred form clips shown in the drawings but may be formed from a plastic material also.

Referring to FIG. 11 a preferred form of fastening system preferably includes lengths of resiliently extensible material such as the loops or lengths 20 of rubber or synthetic elastic cord. In use, the elastic cord 20 is connected to clip 40 by pulling the cord through the entry aperture and into the clip. The other end of the elastic cord is attached to a fastening component 10 and the cord is stretched by pulling the fastening component 10 away from the tree 4 and piercing the fastening component 10 into the sheeting 2, while the cord 20 is stretched to also place the sheeting under tension. Alternatively the fastening component may be first connected to the sheeting and to the cord 20. The cord may then be connected to the clip 40 and the cord stretched so that the fastening component 10 can be connected to the tree 4 (via staples 45), or to any other fixed point. The fastening system of the invention combining clips, cords and fastening claws allows quick and easy fastening and unfastening of the sheeting so that it may be put in place and then subsequently removed and replaced or moved to another area of land. When the sheeting is used as ground cover, the fastening system allows the sheeting to be readily detached along one side of a row of trees or vines and folded back to the other row, then later unfolded and reattached, or unattached along both sides of the sheeting and removed from the field. Such easy and quick reattachment can be desirable during installation of the sheeting in the spring and removal in the autumn. Easy and quick reattachment is also desirable for time critical activities such as during spring frosts to fold back the material to allow ground heat being held by the sheeting to be more easily released to reduce frost damage, and for crops with multiple harvest picks where it is desirable to have the material in place between picks and where it is desirable to fold back the material at each harvest pick.

The foregoing describes the invention including preferred forms thereof. Alterations and modifications as will be obvious to those skilled in the art are intended to be incorporated within the scope hereof as defined by the accompanying claims.

What is claimed is:

1. An agricultural sheeting fastening component capable of connecting a length of elongated resiliently extensible flexible material to a section of agricultural sheeting, textile or film under tension for stretching the resiliently extensible material in anchoring agricultural sheeting, textile or film to a support, said component including two arms, each arm including one or more prongs having a tip adapted to pierce the sheeting, textile or film to connect the component to the sheeting, textile or film, the two arms also being joined at an attachment eye having an entry to the attachment eye defined between two intermediate portions of the two arms, a remote portion of each of the two arms extending away from the intermediate portions at the entry to the attachment eye to thereby position the prong tips outside of an area bounded by a proximal portion of the arms substantially surrounding the attachment eye, and the two arms being resiliently movable at least one away from the other when a hook or loop on one end of said length of resiliently extensible material or a length of inextensible material is manually pulled through said entry and into the eye to connect the hood or loop to the fastening component.

2. A fastening component according to claim 1 wherein the component is formed from wire or plastic.

3. A fastening component as claimed in claim 2 wherein the prongs extend at an acute angle to the arms of the component.

4. A fastening component as claimed in claim 1 wherein the component is formed from a length of wire, each end of which forms a prong of the component.

5. A fastening component as claimed in claim 4 wherein the ends of the length of wire are cut at an angle to provide sharpened points to the prongs of the component.

6. A fastening component as claimed in claim 4 wherein the length of wire is bent intermediate of its length to form the proximate portions of the two arms and the remote portions of the two arms, each of the proximate portions extending to form one side of said attachment eye and then each of the remote portions extending from the respective intermediate portions to position a respective one of said prongs remotely from said attachment eye and wherein each of the arms is bent away from and then towards the other arm partway along the length of the proximate portion of each arm to form said attachment eye.

7. A fastening component as claimed in claim 6 wherein the arms are tensioned towards each other to close said eye but such that a hook or loop may be passed over one of the prongs and between the tensioned arms and into the eye to be attached to the fastening component.

8. A fastening component as claimed in claim 6 wherein each of the arms is bent back on itself at greater than a right angle to form said prongs.

9. A fastening component as claimed in claim 8, there being a junction between the remote portions of the arms and their respective prongs, and wherein the distance between tips of said prongs is less than the distance between each arm to prong junction.

10. A fastening component as claimed in claim 8 wherein each of the arms is of substantially the same length.

11. A fastening component as claimed in claim 8 wherein the eye is substantially quadrilateral in shape.

12. A fastening component as claimed in claim 1 in combination with a length of resiliently extensible material, arranged to be releasably at the other end to the support.

13. A fastening component as claimed in claim 12 wherein the length of resiliently extensible material is provided with a loop at one end.

14. A fastening component as claimed in claim 12 wherein the length of resiliently extensible material is provided with a loop at both ends.

15. A fastening component as claimed in claim 12 wherein the length of resiliently extensible material is cord formed of rubber or a synthetic elastic material.

16. A method of anchoring agricultural sheeting, textile or film to a support including the steps of connecting a length of resiliently flexible or inextensible material to a fastening component as claimed in claim 1 and then attaching the fastening component to the sheeting, textile or film by piercing the prong(s) of the component through the sheeting, textile or film.

17. A method according to claim 16 including piercing the prongs of the component through a reinforced region of the sheeting, textile or film.

18. A method as claimed in claim 17 wherein the length of material is resiliently extensible and the method includes attaching the length of material at one end to said support, and at its other end to said fastening component, stretching the length of material by pulling the fastening component away from the support and connecting the fastening component to the sheeting, textile or film while the resilient means is stretched thereby placing the sheeting, textile or film under tension.

19. A method as claimed in claim 18 including repeating said connecting and attaching steps to connect a fastening component and a length of material between the sheeting, textile or film and a support or supports.

20. A method as claimed in claim 19 including fixing the sheeting, textile or film between about 10 mm and about 500 mm above the ground.

21. Agricultural sheeting, textile or film anchored to a support or supports by the method of claim 19.

22. A fastening system for anchoring agricultural sheeting to a support or supports, including:
   at least one fastening component including one or more prongs adapted to pierce the sheeting, textile or film to connect the fastening component to the sheeting, textile or film, and an attachment eye at an opposite end of the fastening component, and
   at least one clip formed by a single length of material including two end portions which overlap so that the clip is a closed loop and which end portions are resiliently biased towards each other, at least one of the end portions being a terminal end and the terminal end of at least one end portion extending away from the other end portion to form an entry aperture into the closed loop which enables the attachment eye of the fastening component or a length of resiliently extensible and/or inextensible material connectable to the fastening component to be pulled through the entry aperture to connect to or disconnect from the clip, or which enables the clip to itself be connected to or disconnected from another link.

23. A fastening system according to claim 22 wherein the terminal ends of both end portions of the clip extend to form an entry aperture which enables the attachment eye of the fastening component or a length of resiliently extensible and/or inextensible material to be pulled through the entry aperture to connect to or disconnect from the clip, or which enables the clip to itself be connected to or disconnected from another link.

24. A fastening system according to claim 22 wherein the clip is formed from a length of stiff metal wire.

25. A fastening system according to claim 23 wherein the clip is formed from a length of stiff metal wire.

26. A fastening system according to claim 22 wherein the clip is formed from a plastics material.

27. A fastening system according claim 22 wherein said terminal end of the clip extend(s) into the area bound by a circumference of the closed loop of the clip.

28. A fastening system according to claim 22 wherein said terminal end(s) also extend away from a plane of the clip.

29. A fastening system according to claim 22 wherein the fastening component is formed from a single length of stiff metal wire bent to form two arms, the end of each of which forms a prong of the fastening component.

30. A fastening system according to claim 29 wherein said length of wire forming the fastening component is bent intermediate of its length to form said two arms, each of which extends to form one side of said attachment eye and the end of each of which forms one of said prongs, and also to form an entry to the attachment eye defined between two intermediate portions of the two arms.

31. A fastening system according to claim 22 wherein the fastening component is formed from a plastics material.

32. A fastening system according to claim 22 also including a length of resiliently extensible material connectable between the fastening component and the clip to connect the fastening component and the clip.

33. A fastening system according to claim 32 wherein the resiliently extensible material is cord formed of rubber or a synthetic elastic material.

34. A method of anchoring agricultural sheeting to a support including the steps of, in any order, connecting lengths of resiliently extensible material to a number of the fastening claws and the clips of the fastening system as claimed in claim 1, attaching the fastening claws to the sheeting by piercing the prong(s) of the fastening claws through the sheeting, attaching the clips to fixed supports, and including stretching the lengths of material to anchor the sheeting under tension.

35. A fastening component as claimed in claim 1, wherein the proximate portions of the arms meet at a point substantially opposite the entry to the attachment eye, there being a junction between the arms and their respective prongs, the prongs each having a length defined between the respective junction and tip, the distance between the point and the tips of the prongs being greater than the length of the prongs.

* * * * *